(12) United States Patent
Maldaner

(10) Patent No.: US 11,982,385 B2
(45) Date of Patent: May 14, 2024

(54) SUBSEA CONNECTION DEVICE AND ASSEMBLY

(71) Applicant: AKER SOLUTIONS DO BRASIL LTDA, Curitiba (BR)

(72) Inventor: Marcelo Maldaner, Curitiba Parana (BR)

(73) Assignee: AKER SOLUTIONS DO BRASIL LTDA, Curitiba (BR)

( * ) Notice: Subject to any disclaimer, the term of this patent is extended or adjusted under 35 U.S.C. 154(b) by 124 days.

(21) Appl. No.: 17/761,601

(22) PCT Filed: Sep. 18, 2020

(86) PCT No.: PCT/NO2020/050240
§ 371 (c)(1),
(2) Date: Mar. 18, 2022

(87) PCT Pub. No.: WO2021/054842
PCT Pub. Date: Mar. 25, 2021

(65) Prior Publication Data
US 2022/0364663 A1    Nov. 17, 2022

(30) Foreign Application Priority Data

Sep. 20, 2019 (GB) .................................... 1913585

(51) Int. Cl.
*F16L 27/08* (2006.01)
*F16L 37/00* (2006.01)
*F16L 37/12* (2006.01)

(52) U.S. Cl.
CPC ............. *F16L 37/002* (2013.01); *F16L 37/12* (2013.01)

(58) Field of Classification Search
CPC . F16L 1/26; F16L 1/265; F16L 37/002; F16L 37/12; F16L 37/62; F16L 37/26; F16L 43/00; F16L 43/02; F16L 27/08; F16L 27/0804; F16L 27/0837; F16L 27/0845; F16L 27/0849; F16L 27/0861; F16L 27/0865; F16L 27/093
USPC ........................................................ 285/920
See application file for complete search history.

(56) References Cited

U.S. PATENT DOCUMENTS

| | | | |
|---|---|---|---|
| 3,233,667 A | 2/1966 | Van Winkle | |
| 4,079,752 A * | 3/1978 | Paddington | ............. F16L 23/04 251/149.9 |
| 4,615,646 A | 10/1986 | Langner | |
| 5,593,249 A | 1/1997 | Cox et al. | |
| 6,098,715 A | 8/2000 | Seixas et al. | |
| 6,481,504 B1 | 11/2002 | Gatherar | |
| 2020/0157923 A1 | 5/2020 | Lillejordet et al. | |

FOREIGN PATENT DOCUMENTS

NO          315579 B1    9/2003

* cited by examiner

*Primary Examiner* — Aaron M Dunwoody
(74) *Attorney, Agent, or Firm* — Norman B. Thot

(57) ABSTRACT

A connection device for mating and making up a subsea connection. The connection device includes a first pipeline end which is fixable to an end of a subsea pipeline, a first connection element which is connected to the first pipeline end, and a second connection element which is connected to the first connection element. The first connection element is rotatably connected to the second connection element.

15 Claims, 4 Drawing Sheets

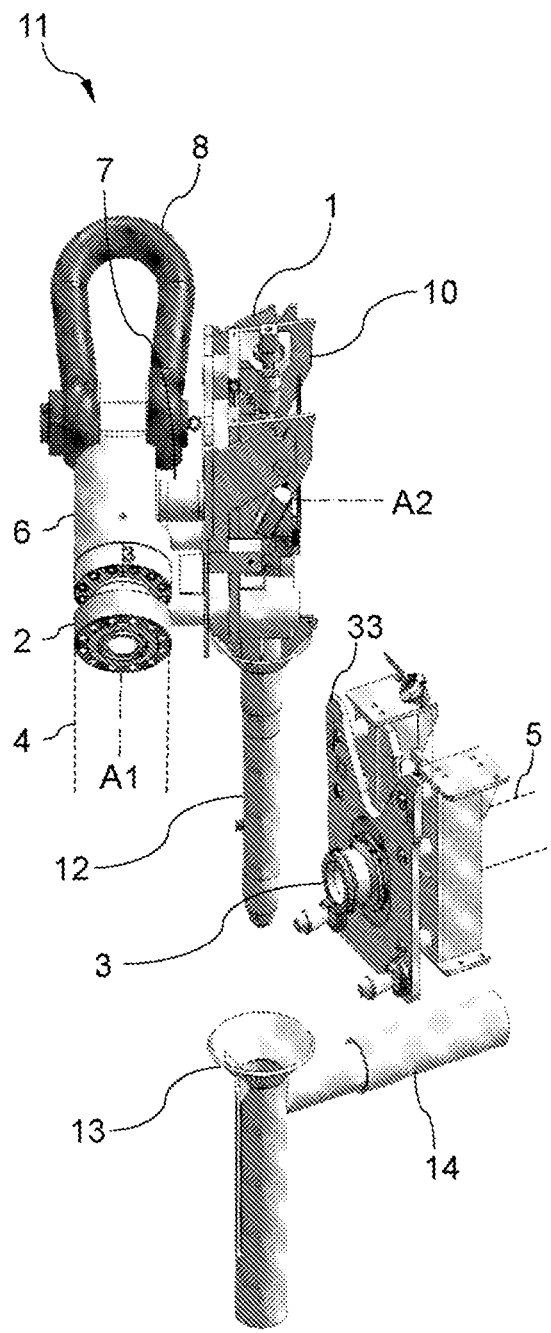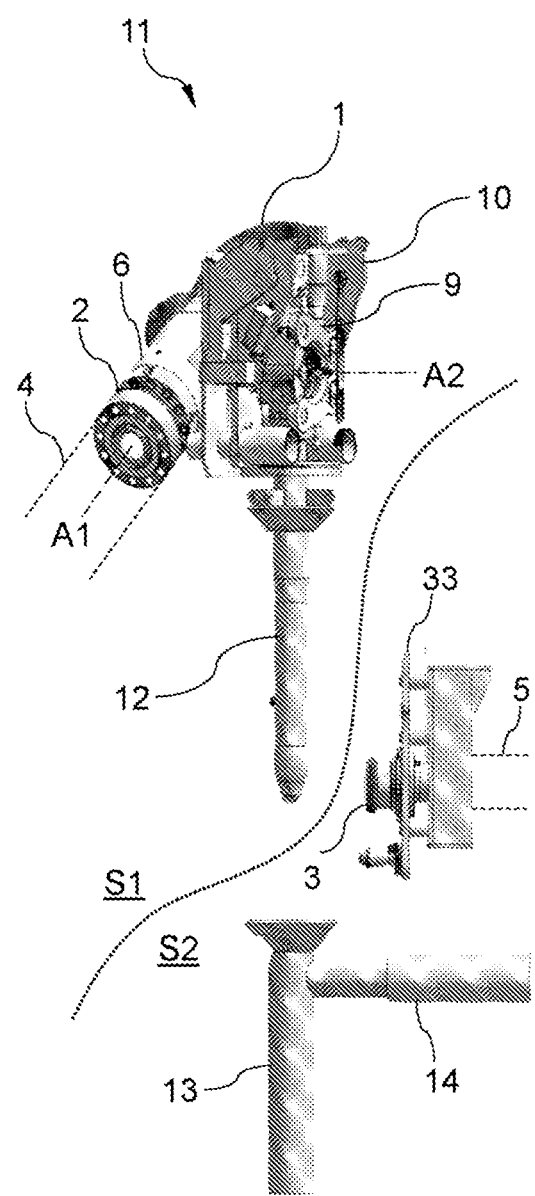
Fig. 1                    Fig. 2

SUBSEA CONNECTION DEVICE AND ASSEMBLY

CROSS REFERENCE TO PRIOR APPLICATIONS

This application is a U.S. National Phase application under 35 U.S.C. § 371 of International Application No. PCT/NO2020/050240, filed on Sep. 18, 2020 and which claims benefit to Great Britain Patent Application No. 1913585.4, filed on Sep. 20, 2019. The International Application was published in English on Mar. 25, 2021 as WO 2021/054842 A1 under PCT Article 21(2).

FIELD

The present invention relates to a subsea connection device and assembly for mating and making up a connection between a first pipeline end and a second pipeline end at a subsea installation.

BACKGROUND

Tie-in systems are essential building blocks in subsea installations. They provide safe and leak-proof connections between subsea infrastructure and flowlines, umbilicals, modules and pipelines for the import or export of oil or gas. Tie-in systems may be designed for quick, cost-effective installations in shallow or deep waters, and they provide a large range of possible applications.

A common type of tie-in system is a horizontal connection system, or "HCS". HCSs may be a diverless tie-in system made for subsea connection of horizontal rigid jumpers and spools, flexible flow lines and umbilicals. HCSs can be installed with or without guidewires and allows for the landing and wet storing of jumpers and terminations prior to manifold or XT installation, or for the retrieval of a tree or manifold without removal of the spool or jumper. An HCS may be available with insulation.

HCSs today do not, however, allow much movement of a first pipeline relative to a second pipeline to be connected, thereby making the actual connection a cumbersome process where the pipelines must have a preferred angle and direction prior to and during connection, and only allowing for small deviations. Specific requirements are related to the positioning of the pipelines, making such a tie-in operation a complex task.

Documents which may be useful for understanding the field of technology include U.S. Pat. Nos. 6,481,504 B1, 6,098,715 A, 5,593,249 A, and 4,615,646 A.

SUMMARY

An aspect of the present invention is to provide an improved connection device to reduce or eliminate the above mentioned disadvantages of known techniques. A further aspect of the present invention is to provide further advantages over the state of the art.

In an embodiment, the present invention provides a connection device for mating and making up a subsea connection. The connection device includes a first pipeline end which is configured to be fixed to an end of a subsea pipeline, a first connection element which is connected to the first pipeline end, and a second connection element which is connected to the first connection element. The first connection element is rotatably connected to the second connection element.

BRIEF DESCRIPTION OF THE DRAWINGS

The present invention is described in greater detail below on the basis of embodiments and of the drawings in which:

FIG. 1 is a perspective view of a first embodiment of a connection device and first and second pipeline ends;

FIG. 2 is a side view of the first embodiment of the connection device and first and second pipeline ends of FIG. 1;

DETAILED DESCRIPTION

Figure 3:
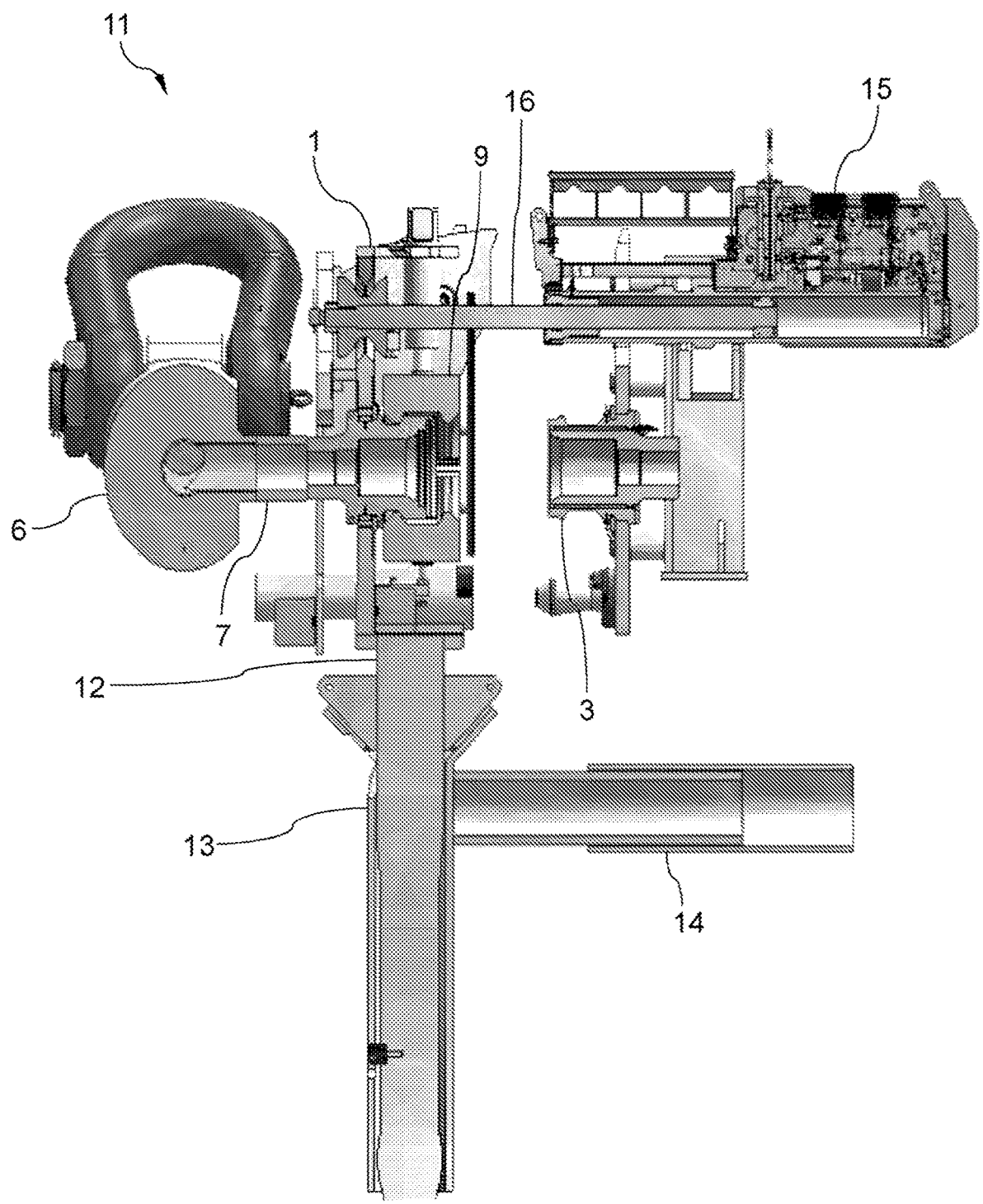
FIG. 3 is a section view of the first embodiment of a connection device and first and second pipeline ends, where a "tie-in tool" is connected to the connection device.

In an embodiment, the present invention provides a connection device for mating and making up a subsea connection, the connection device having a first pipeline end configured to be fixed to an end of subsea pipeline, the connection device comprising: a first connection element connected to the first pipeline end; a second connection element connected to the first connection element; wherein the first connection element is rotatably connected to the second connection element.

In an embodiment, the present invention provides a connection device assembly for mating and making up a connection between a first pipeline end and a second pipeline end comprising a connection device, a pile, and a funnel for receiving the pile.

The appended claims and the detailed description below outline further embodiments.

The following description may use terms such as "horizontal", "vertical", "lateral", "back and forth", "up and down", "upper", "lower", "inner", "outer", "forward", "rear", etc. These terms generally refer to the views and orientations as shown in the drawings and that are associated with a normal use of the present invention. The terms are used for the reader's convenience only and shall not be limiting.

FIGS. 1 and 2 initially illustrate a connection device 1, a first pipeline end 2, and a second pipeline end 3, viewed from different angles. The connection device 1 is connected to the first pipeline end 2 and is configured for mating and making up a connection between the first pipeline end 2 and the second pipeline end 3. The first pipeline end 2 may be positioned at the end of a first pipeline 4, which is indicated with dotted lines in FIGS. 1 and 2, and the second pipeline end 3 may be positioned at the end of a second pipeline 5, which is also indicated with dotted lines in FIGS. 1 and 2. The connection device 1 is configured for being in a mating state where the first pipeline end 2 can be mated with the second pipeline end 3 and a connected state where the first pipeline end 2 is connected to and in fluid communication with the second pipeline end 3. In FIGS. 1 and 2, the connection device 1 is in the mating state where the first pipeline end 2 and connection device 1 is brought towards the second pipeline end 3.

The connection device 1 comprises a first connection element 6. The first connection element 6 is connected to the first pipeline end 2 and is configured for forming a fluid communication between the first and second pipeline ends 2, 3. The first connection element 6 may be connected to the first pipeline end 2 by a fastening element, such as screws, bolts, or other means elements in the art for securing two flanges to each other. The first connection element 6 may comprise an end portion 7 (which is not visible in FIG. 2) that may protrude perpendicularly from the body of the first connection element 6, as in the illustrated embodiment. A longitudinal axis A1 of the first pipeline end 2 is thus generally perpendicular to a longitudinal axis A2 of the end portion 7. The end portion 7 also provides a fluid communication between the first and second pipeline ends 2, 3 when they are connected with the connection device 1.

A lifting element 8, such as a shackle or a padeye, may be connected to the first connection element 6. The lifting element 8 may be rotatably connected to the first connection element 6 and provides for a single interface and easy lifting of the first connection element 6 and first pipeline end 2. The lifting element 8 may be lifted by a crane, a winch, or a similar device, as is known in the art of lifting subsea components.

The connection device 1 further comprises a second connection element 9. The second connection element 9 is connected to the first connection element 6 and is configured for connecting the first connection element 6 to the second pipeline end 3. The second connection element 9 may be a clamp which is configured for retaining the first connection element 6 and the second pipeline end 3 in the connected state as in the illustrated embodiment. The second connection element 9 may alternatively comprise, for example, a hydraulic collet, a clamp, a split ring, locking dogs, or any other suitable type of connector. In the mating state, the second connection element 9 may be open so as to allow the second pipeline end 3 to easily enter and be accommodated in the second connection element 9, and in the connected state, the second connection element 9 may abut flanges (not shown in FIGS. 1 and 2, see FIG. 3) which are provided on the end portion 7 and on the second pipeline end 3 so as to force the end portion 7 and second pipeline end 3 together in a leak-tight manner.

The second connection element 9 may be supported in a housing 10. When the first pipeline end 2 and first connection element 6 is lifted, the second connection element 9 and alternatively the housing 10 is consequently also lifted, because the second connection element 9 is connected to the first connection element 6. In this state, when the connection device 1 does not make up a connection between the first and second pipeline ends 2, 3, the connection device 1 is in a mating state where it is either about to mate and make up a connection, or is removed from such a connection.

The first connection element 6 is rotatably connected to the second connection element 9, and the second connection element 9 may thus rotate relative to the first connection element 6. The rotatable connection may be arranged so as to allow the first connection element 6 to rotate about the longitudinal axis A2, i.e., about the longitudinal axis of the end portion 7 and the second connection element 9. The housing 10 may optionally comprise fluid channels so that the orientation of the second connection element 9 is different, in which case the first connection element 6 may be arranged to rotate about a different axis.

This rotatable connection allows the first pipeline 4 to be angled relative to the second pipeline 5. The size of the angle is not of significant importance as the first connection element 6 can rotate and adapt to the angle of the first pipeline 4. Because the first connection element 6 is rotatably connected to the second connection element 9, virtually zero moment is transferred from the first pipeline 4 to the connection device 1.

A connection device assembly 11 may comprise the connection device 1 and a pile 12. The pile 12 may be connected to the housing 10, as in the illustrated embodiment, and may be hingedly connected to the connection device 1 so that when the connection device 1 is lifted and suspended, the pile 12 is naturally suspended in a position in which it points straight down due to its weight. The pile 12 is connected to the connection device 1 on the underside of the housing 10 in the illustrated embodiment. The connection device 1 and pile 12 are provided at a first pipeline end side S1 (indicated in FIG. 2) of the connection device assembly 11, the other side of the connection device assembly 11 being the second pipeline end side S2, as also indicated in FIG. 2. The two sides S1, S2 are indicated in FIG. 2 and are separated by a dotted line. The first pipeline end side S1 is the side of the connection device assembly 11 related to and connected to the first pipeline end 2. The second pipeline end side S2 of the connection device assembly 11 is the side related to and being in vicinity of the second pipeline end 3, such as a subsea installation.

A funnel 13 for receiving the pile 12 may be provided at the second pipeline end side S2 of a connection device assembly 11. The funnel 13 may be retractable in a direction towards the second pipeline end 3 via a retractable element 14. The retractable element 14 is described further with reference to FIG. 3. When the connection device 1 and first pipeline end 2 is lifted and hoisted towards the second pipeline end 3, the pile 12 may be aimed at the funnel 13. The connection device 1 and first pipeline end 2 may be lowered and the pile 12 thus enters the funnel 13 and may come to rest when the pile 12 is fully inserted into the funnel 13 (as illustrated in FIG. 3). This provides for an easy guiding and positioning of the first pipeline end 2 relative to the second pipeline end 3.

FIG. 3 illustrates a section view of the connection device assembly 11 and connection device 1 when the pile 12 is completely installed in the funnel 13. The end portion 7 of the first connection element 6 and the second pipeline end 3 rest at the same elevation and are aligned, but spaced apart. In order to align the end portion 7 and the second pipeline end 3, the connection device 1 may be rotated so that the pile 12 is rotated within the funnel 13 until the longitudinal axis A2 (illustrated in FIGS. 1 and 2) of the end portion 7 is coincident with a longitudinal center axis of the second pipeline end 3. The second connection element 9 may be in a mating state ready to receive and accommodate the second pipeline end 3. The rotation of the connection device 1 may be effected by, for example, a front face or structural part of the housing 10 engaging a corresponding front face or structural part of a support component 33 (see FIGS. 1 and 2) which holds (or is otherwise connected to or fixed in relation to) the second pipeline end 3. Guide pins or bars, or a different type of guide and alignment mechanism, may alternatively be used to rotate the connection device 1. When the connection device 1 is moved towards the second pipeline end 3, it may consequently be guided into the correct orientation before make-up of the fluid connection.

A stroke tool 15 may be provided in the vicinity of the second pipeline end 3, i.e., at the second pipeline end side, as previously described with reference to FIG. 2. The stroke tool 15 may alternatively also be provided or be a part of the connection device 1, i.e., be provided at the first pipeline end side. The stroke tool 15 is configured for extending and connecting to the connection device 1, and the stroke tool 15 can thus pull the connection device 1 and first pipeline end 2 towards the second pipeline end 3.

In the illustrated embodiment, the stroke tool 15 comprises an engagement arm 16 that may extend from the stroke tool 15 and engage with the connection device 1. When the stroke tool 15 retracts the engagement arm 16, the connection device 1 and first pipeline end 2 is pulled towards the second pipeline end 3.

In the illustrated embodiment, the retractable element 14 provides support and stability to the connection device assembly 11. The retractable element 14 may thus be a telescopic arm or similar device capable of providing lateral support to the connection device 1 and first pipeline. The retractable element 14 may alternatively be a piston or similarly powered retractable element, in which case the stroke tool 15 may be incorporated into the retractable element 14.

Figure 4:
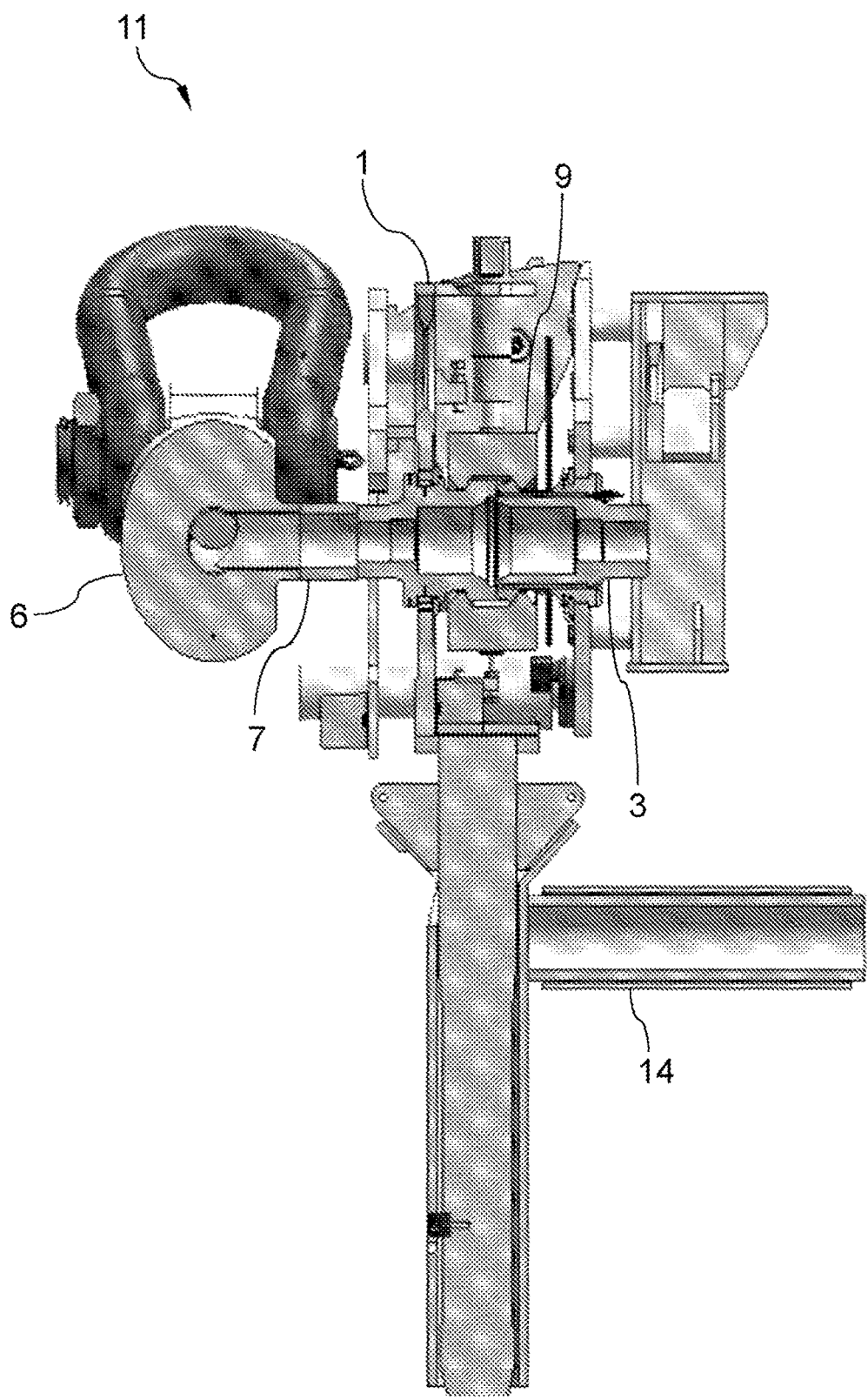
FIG. 4 is a section view of the first embodiment of a connection device, where the first and second pipeline ends are connected.

FIG. 4 illustrates a section view of the connection device assembly 11 and connection device 1 when the connection device 1 is mated with the second pipeline end 3. In this connected state, the second connection element 9 connects the first connection element 6 and the second pipeline end 3 so that a fluid communication is provided between the first and second pipeline ends 2, 3. The end portion 7 of the first connection element 6 abuts the pipeline end 3, and the second connection element 9 forces the two elements together and provides a leak-tight connection. The retractable element 14 has been retracted, and there is no longer need for a stroke tool, as the second connection element 9 is sufficient to provide the first and second pipeline ends 2, 3 in the connected state. In this connected state, the first pipeline (not illustrated in FIG. 4; see FIGS. 1 and 2) has settled on the seabed, and as such there is basically no moment transferred from the first pipeline end (not illustrated in FIG. 4; see FIGS. 1 and 2) to the second pipeline end 3.

Figure 5:
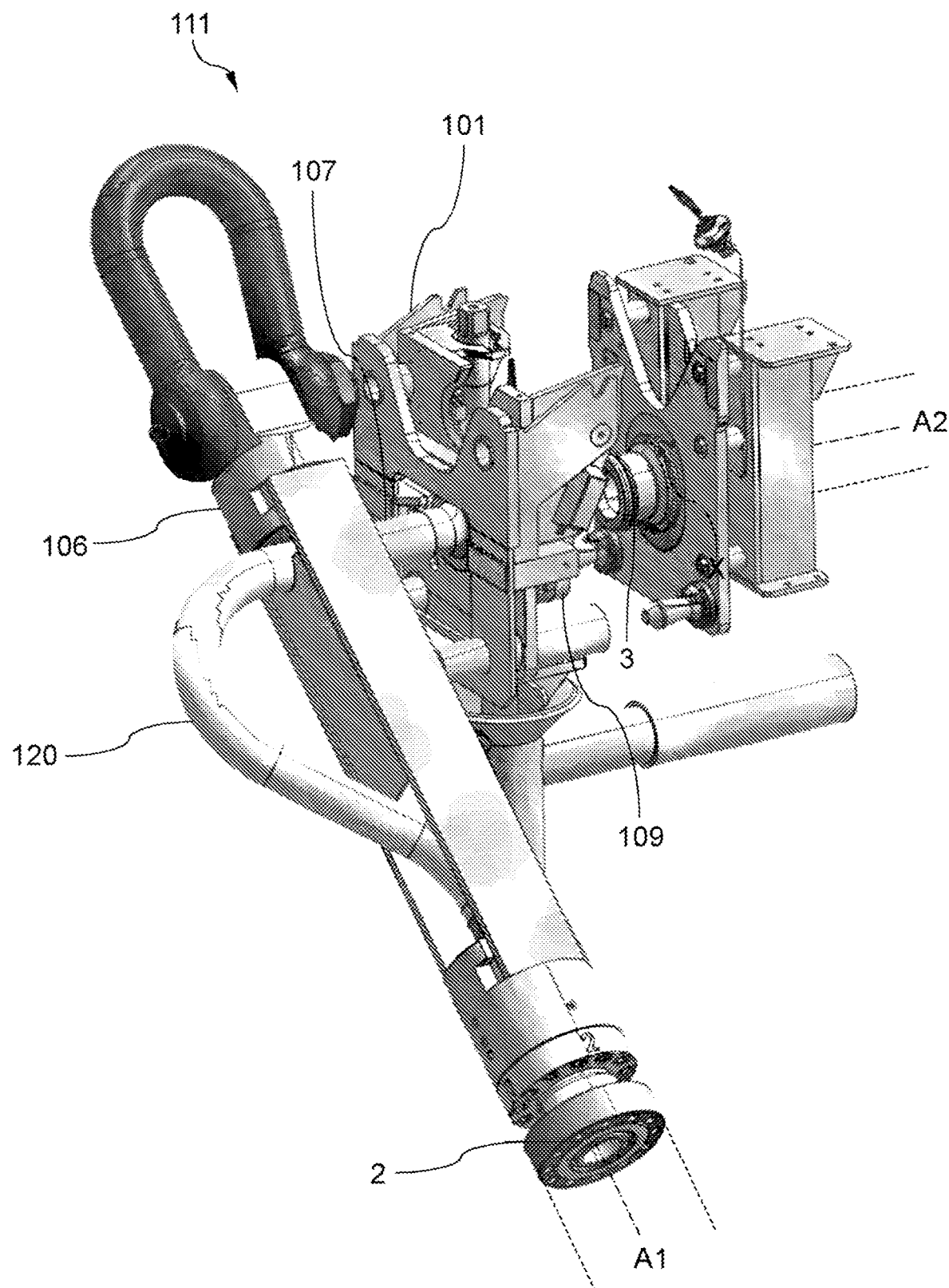
FIG. 5 is a perspective view of a second embodiment of a piggable connection device and first and second pipeline ends.

FIG. 5 illustrates a second embodiment of a connection device 101 and a connection device assembly 111. The connection device 101 is connected to a first pipeline end 2 and is configured for mating and making up a connection between the first pipeline end 2 and the second pipeline end 3 similar to the first embodiment. Unless otherwise described, the features and functions of the first embodiment of the connection device and connection device assembly are also provided in the second embodiment.

The connection device 101 comprises a first connection element 106. The first connection element 106 is connected to the first pipeline end 2 and is configured for forming a fluid communication between the first and second pipeline ends 2, 3 similarly to the first embodiment. The first connection element 106 may comprise an end portion 107 that provides a fluid communication between the first and second pipeline ends 2, 3 when they are connected. A longitudinal axis A1 of the first pipeline end 2 may be generally perpendicular to a longitudinal axis A2 of the end portion 107.

The first connection element 106 according to the second embodiment comprises a bend 120 provided between the end portion 107 and the connection to the first pipeline end 2. The bend 120 provides a fluid communication through the first connection element 106, and the bend 120 allows a pig to be communicated through the first connection element 106. A pig is known in the art as a device for performing various maintenance operations in pipelines. The connection device 101 comprising the bend 120 may thus be a piggable connection device 101.

Embodiments according to the present invention may thus provide improvements to known solutions, for example, by reducing or avoiding problems associated with bending moments. This reduces the requirements for the connector device and/or stroking system in that they must be designed with higher capacity and strength, which may, for example, increase size and weight of the components. In some applications, there may be a need to include additional components, such as isolation valves, in the system. Such components may contribute to increase bending moments and structural requirements in conventional systems. Embodiments of the present disclosure may allow inclusion of such components with less requirements on the other components. Embodiments may additionally or alternatively provide a system which is less sensitive to alignment of the first pipeline 4 in relation to the second pipeline end 3.

While the present invention has been described with reference to the embodiment(s) mentioned above, it is to be understood that modifications and variations can be made without departing from the scope of the present invention, and that such modifications and variations shall remain within the field and scope of the present invention. Reference should also be had to the appended claims.

LIST OF REFERENCE NUMERALS

1 Connection device
2 First pipeline end
3 Second pipeline end
4 First pipeline
5 Second pipeline
6 First connection element
7 End portion
8 Lifting element
9 Second connection element
10 Housing
11 Connection device assembly
12 Pile
13 Funnel
14 Retractable element
15 Stroke tool
16 Engagement arm
33 Support component
101 Connection device
106 First connection element
107 End portion
109 Second connection element
111 Device assembly
120 Bend
A1 Longitudinal axis (of first pipeline end 2)
A2 Longitudinal axis (of end portion 7')
S1 First pipeline end side
S2 Second pipeline end side

What is claimed is:

1. A subsea tie-in system comprising:
   a first pipeline comprising an end;
   a second pipeline which is connected to a subsea installation, the second pipeline comprising a second pipeline end; and
   a connection device for mating and making up a subsea connection between the first pipeline and the second pipeline, the connection device comprising,
   a first pipeline end which is configured to be fixed to the end of the first pipeline,
   a first connection element which is connected to the first pipeline end, and
   a second connection element which is connected to the first connection element and which is configured to connect the first connection element to the second connection element so as to form a fluid communication between the first pipeline end and the second pipeline end, wherein, the first connection element is rotatably connected to the second connection element.

2. The subsea tie-in system as recited in claim 1, wherein the second connection element comprises a clamp, a hydraulic collet, a split ring, or locking dogs, each of which is/are configured to connect the first connection element and the second pipeline end.

3. The subsea tie-in system as recited in claim 1, wherein the connection device is configured to have a mating state where the first pipeline end is not connected with the second pipeline end and a connected state where the first pipeline end is connected to and in the fluid communication with the second pipeline end.

4. The subsea tie-in system as recited in claim 3, wherein the first connection element is prevented from rotating relative to the second connection element in the connected state.

5. The subsea tie-in system as recited in claim 1, wherein the first connection element comprises an end portion which is configured to interface with the second connection element, the end portion comprising a longitudinal axis which is oriented perpendicular to a longitudinal axis of the first pipeline end.

6. The subsea tie-in system as recited in claim 5, wherein the first connection element is configured to rotate about the longitudinal axis of the end portion.

7. The subsea tie-in system as recited in claim 5, wherein the second connection element is arranged on the end portion.

8. The subsea tie-in system as recited in claim 5, wherein the longitudinal axis of the end portion is substantially horizontal when the connection device is in an installed position.

9. The subsea tie-in system as recited in claim 1, wherein the first connection element comprises a bend so as to provide a piggable connection device.

10. A connection device assembly for mating and making up a connection between a first pipeline end and a second pipeline end, the connection device assembly comprising:

a connection device comprising, a first pipeline end which is configured to be fixed to an end of a subsea pipeline, a first connection element which is connected to the first pipeline end, and a second connection element which is connected to the first connection element;

wherein, the first connection element is rotatably connected to the second connection element;

a pile; and a funnel which is configured to receive the pile.

11. The connection device assembly as recited in claim 10, wherein the pile is hingedly connected to the connection device.

12. The connection device assembly as recited in claim 10, wherein the funnel is configured to be retractable in a direction of the second pipeline end.

13. The connection device assembly as recited in claim 10, further comprising:

a stroke tool which is configured to pull the connection device into contact with the second pipeline end.

14. The connection device assembly as recited in claim 13, wherein the stroke tool comprises an actuator which is configured to move the funnel so as to pull the connection device into contact with the second pipeline end.

15. The connection device assembly as recited in claim 13, wherein the stroke tool is arranged at a second pipeline end side of the connection device assembly.

* * * * *